(12) United States Patent
Roszak

(10) Patent No.: US 7,097,296 B2
(45) Date of Patent: Aug. 29, 2006

(54) COMPOSITION FOR PRINTING ON VELLUM AND THE LIKE

(76) Inventor: Amy C. Roszak, 3858 County Rt 45, Oswego, NY (US) 13126

( * ) Notice: Subject to any disclaimer, the term of this patent is extended or adjusted under 35 U.S.C. 154(b) by 333 days.

(21) Appl. No.: 10/728,478

(22) Filed: Dec. 5, 2003

(65) Prior Publication Data

US 2004/0206268 A1    Oct. 21, 2004

Related U.S. Application Data

(60) Provisional application No. 60/464,163, filed on Apr. 21, 2003.

(51) Int. Cl.
*B41J 2/01*      (2006.01)

(52) U.S. Cl. ...................................... 347/101; 347/105
(58) Field of Classification Search ................ 347/101, 347/105, 102, 100; 428/195, 32.1
See application file for complete search history.

(56) References Cited

U.S. PATENT DOCUMENTS

| 4,490,410 A | * | 12/1984 | Takiyama et al. ........... 427/504 |
| 4,608,108 A | * | 8/1986 | Goll ............................. 156/219 |
| 5,698,264 A | * | 12/1997 | Gumbert ...................... 427/282 |

* cited by examiner

*Primary Examiner*—Manish S. Shah

(57) ABSTRACT

There is disclosed a powdered composition that enhances the adherence of print to hard and uneven finish printing stock such as vellum, as well as a method of using the composition on such printing stock.

5 Claims, No Drawings

COMPOSITION FOR PRINTING ON VELLUM AND THE LIKE

The priority of U.S. Provisional Application No. 60/464,163, filed Apr. 21, 2003 is claimed.

BACKGROUND OF THE INVENTION

There is a wide variety of printing stock available for printing invitations, announcements and journaling blocks and titles in scrapbooks, photo albums and the like. The most desirable types of printing stock from an aesthetic appearance standpoint are hard and uneven finish papers. A particularly desirable printing stock is vellum. However, the principal drawbacks of vellum are the difficulty of getting ink to adhere to the hard, somewhat slick finish and the long drying time for the ink. The same drawbacks hold true for other aesthetically appealing hard finish printing stock such as coated paper, glossy paper, rice paper, calendered paper and cellulose acetate film; as well as for printing stock having a non-uniform surface texture, such as handmade papers.

There is therefore a need in the art of printing for a solution to the problems of securing adherence of ink and speeding up the ink drying time when printing on the aforementioned types of printing stock. This need is met by the present invention, which is summarized and described in detail below.

BRIEF SUMMARY OF THE INVENTION

According to a principal aspect of the invention, there is provided a powdered composition comprising plaster of Paris and a filler for printing on printing stock of the types mentioned above.

In a second aspect of the invention, the above composition is contained within a dispenser suitable for substantially uniform dispensation of the composition.

In a third aspect of the invention, there is provided a method of printing on such printing stock comprising substantially uniformly distributing the above composition on a surface of such printing stock, removing excess composition, and printing characters on the surface.

The invention is particularly useful for smaller scale printing jobs, such as are encountered in the fabrication of scrapbooks, photo albums and the like.

DETAILED DESCRIPTION OF PREFERRED EMBODIMENTS

In its broadest aspect the printing composition comprises a substantially dry powdered mixture of from about 50 to about 95 wt % plaster of Paris and from about 5 to about 50 wt % of at least one filler. When distributed over the surface of printing stock such as vellum, coated paper, glossy paper, rice paper, calendered paper, cellulose acetate and handmade papers, the composition of the invention dramatically enhances the adherence of ink or toner to the printing stock and substantially hastens the ink's drying time.

Suitable fillers include virtually any powdered substance that does not interfere with the ink adherence and ink drying functions of the plaster of Paris. Exemplary fillers include, without limitation, silica, sodium bicarbonate, calcium carbonate, cornstarch, talc, baking powder and kaolin clay. Although plaster of Paris is itself a desiccant, the composition may include at least one other desiccant, such as activated alumina, calcium chloride, zinc chloride and silica gel, in an amount of up to about 10 wt %.

In an especially preferred embodiment, the composition of the invention comprises about 80 wt % plaster of Paris and 20 wt % silica, although other ratios within the above-noted range will work as well, including up to 50 wt % each of plaster of Paris and filler.

The composition of the invention is preferably contained within a dispenser for application to the hard finish printing stock. Exemplary dispensers include a pouch, a compact and brush combination, and a perforated container. The perforated container may be substantially in the form of a salt or pepper shaker, but is preferably provided with a cap over the perforated top so as to prevent spills and maintain the composition substantially dry. The composition may be formed into a cake that is contained within a closeable and openable shallow container such as a compact used for the application of cosmetics, and supplied with a brush for applying the composition to the printing stock. The composition may also be contained within a dry aerosol container such as a rubber ball with an applicator tip or a plastic tube with an applicator tip. A preferred container comprises a closed felt pouch with or without a flap that may be secured in a closed position by a Velcro®-type hook-and-loop fastener, although other fasteners such as zippers, buttons and snaps may be used as well. An especially preferred container comprises a felt pouch sewn shut that permits the powdered composition to permeate the felt in small amounts, in much the same manner as a resin bag.

Use of the composition of the invention is straightforward. The composition is dusted in a light coat substantially uniformly over a surface of the printing stock on which printing is desired, excess composition is removed from the surface by wiping, brushing, lightly shaking or by puffs of air, then the printing stock is subjected to printing manually or by a rubber stamp or by a machine, such as a typewriter, a computer printer, etc.

EXAMPLE

A sheet of vellum paper stock was sent through a computer printer without pretreating it with the composition of the invention. The resulting printed text on the untreated vellum sheet was barely legible, with many incomplete characters and the ink took 2.5 minutes to dry to the touch.

A sheet of the same vellum stock was laid flat on a table and a composition comprising 80 wt % plaster of Paris and 20 wt % silica was distributed from a felt pouch over the surface on which printing was desired by lightly patting the pouch all over the surface, thereby allowing the powdered composition to permeate the felt and adhere to the vellum surface. The surface was then wiped gently with the felt pouch to distribute the composition substantially uniformly over the surface. The sheet was then lifted and gently shaken to remove excess composition. The so-dusted sheet was then placed in the paper tray of the same computer printer and subjected to printing. The printed text on the vellum sheet was clear and legible, with no breaks in the characters, and the ink was dry to the touch within 40 seconds.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

The invention claimed is:

1. A method of printing on surfaces of printing stock selected from the group consisting of vellum, coated paper, cellulose acetate paper, glossy paper, rice paper, handmade paper, and calendered paper, and other surfaces which are difficult to print upon due to resisting or bleeding of the ink or due to unacceptably long drying times, comprising the steps of: applying a dry powder composition consisting from about 50 to 95 wt % plaster of Paris and from about 6 to about 50 wt % of at least one filler by a dispenser, substantially uniformly over a surface of said printing stock;

Removing excess composition from said surface; and

Printing characters on said surface with a printing composition using a computer printer;

Wherein said dispenser is a closed pouch made of felt or other porous material and said printing composition is liquid ink.

2. The method of claim 1, wherein said at least one filler is selected from group consisting of silica, sodium bicarbonate, calcium carbonate, cornstarch, talc, backing powder and kaolin clay.

3. The method of claim 1, said composition comprising about 80 wt % of plaster of Paris and about 20 wt % silica.

4. The method of claim 1, wherein the dispenser is a brush or perforated container.

5. The method of claim 1, wherein printing characters on said surface with printing composition using rubber stamp, typewriter, pen or marker.

* * * * *